Oct. 14, 1969  S. C. S. ARFELT  3,472,278
SLIDE VALVE FOR OPENING AND CLOSING AT LEAST ONE PASSAGE
FOR A FLOWING MEDIUM AND AN APPARATUS COMPRISING
AT LEAST ONE SUCH SLIDE VALVE
Filed Oct. 23, 1967
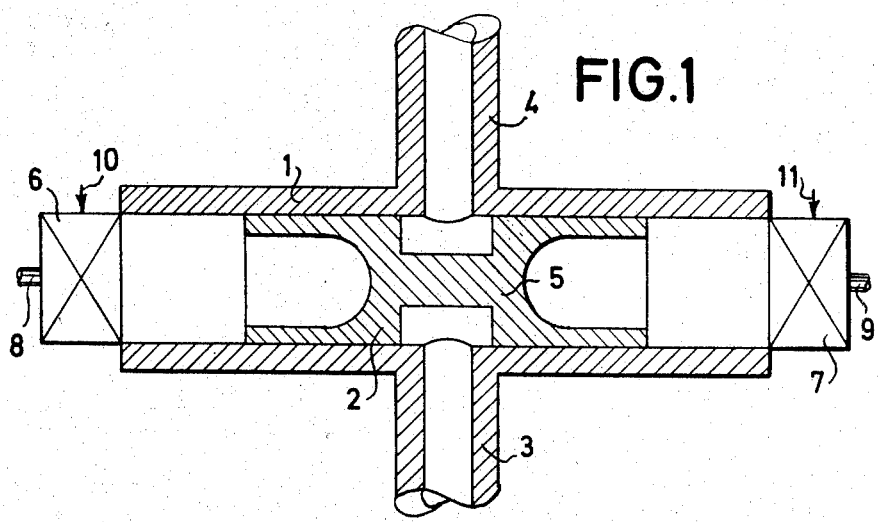
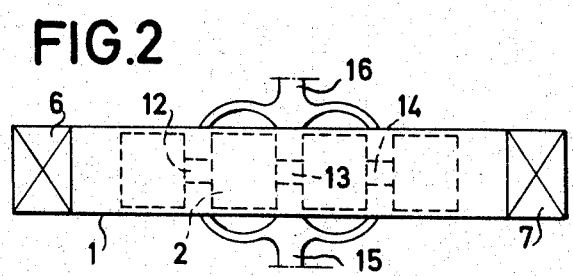
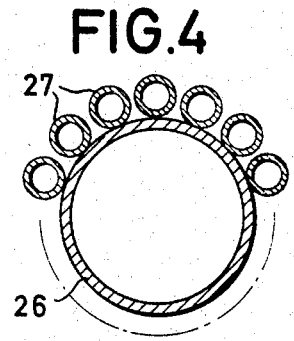
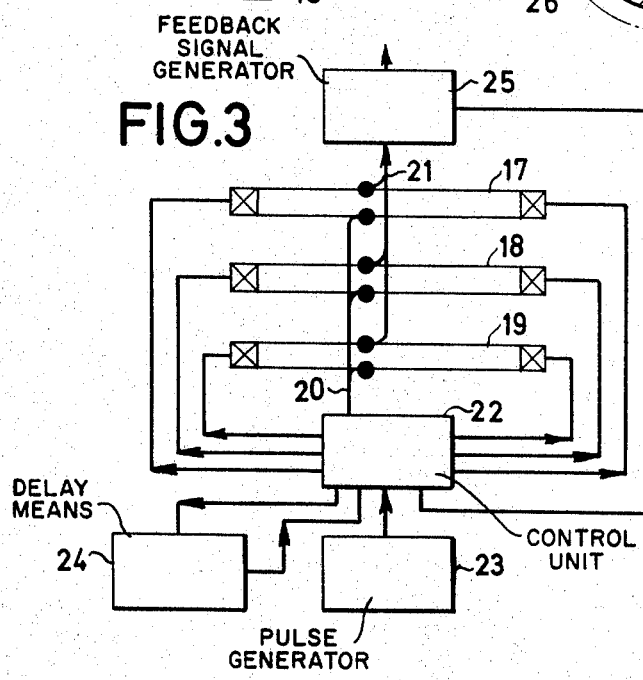

United States Patent Office 3,472,278
Patented Oct. 14, 1969

3,472,278
SLIDE VALVE FOR OPENING AND CLOSING AT LEAST ONE PASSAGE FOR A FLOWING MEDIUM AND AN APPARATUS COMPRISING AT LEAST ONE SUCH SLIDE VALVE
Søren Christian Schoubye Arfelt, Soborg, Denmark, assignor to Henriksen & Henriksen I/S, Copenhagen, Denmark, a company of Denmark
Filed Oct. 23, 1967, Ser. No. 677,227
Claims priority, application Denmark, Oct. 27, 1966, 5,598/66
Int. Cl. F15b 21/12
U.S. Cl. 137—624.2                               7 Claims

ABSTRACT OF THE DISCLOSURE

A slide valve comprising a slide having two stable end positions in which a passage for a flowing medium is closed and an unstable intermediate position in which said passage is open, means being provided for moving the slide without stop from one of said end positions to the other and vice versa, by which movement a well-defined short opening of said passage is obtained. Also an apparatus comprising one or more of said slide valves and means for controlling the movement of the slide in such a way that the passage is opened at the desired moment.

---

The invention relates to a slide valve for opening and closing at least one passage for a flowing medium, comprising a cylinder with one or more inlets and outlets for the said medium, a slide that is axially displaceable in the cylinder, and means for displacing the slide in the cylinder.

Known valves of this type are generally so arranged that the slide has two stable positions, viz. the two end positions, and that the slide is reciprocated between the said two positions when activated from outside, e.g. by supplying a working medium to one and the other of the ends of the cylinder. In one of the end positions the slide causes the passage to be closed between one or more inlets and one or more outlets for the flowing medium, while the said passages are open in the other end position of the slide.

The present invention aims at providing a slide valve by which it is possible to obtain a well-defined opening of a very short duration of the passage for the flowing medium.

To attain this the slide valve is characterized in that the slide is so designed, and the inlets and outlets so disposed on the cylinder, that the said passage or passages for the flowing medium are only open in an unstable intermediate position of the slide, but closed in the stable end positions of the slide. Due to these measures the slide is inactive during at least a main part of each acceleration and deceleration, and is active viz. opens for the passage of the flowing medium, only for a short time during which the slide passes an intermediate position at a great velocity. Hereby the slide valve, according to the invention, gets a dynamic function as distinct from the known slide valve, which has a static function and utilizes only the opening and closing functions which the slide causes in the stable end positions, whereas in the case of the slide valve, according to the invention, the short opening and closing caused by the slide during its movement from one end position to the other is utilized.

A further advantage of the slide valve, according to the invention, is that it is possible by means of a small quantity of working medium to control comparatively large quantities of the flowing medium.

In a slide valve comprising several passages for the flowing medium the slide may, according to the invention, be so designed, and the inlets and outlets so disposed on the cylinder, that all passages for the flowing medium are opened and closed simultaneously. In this case it is possible to obtain a large passage area for the flowing medium, which is of particular importance in the case of short opening periods.

The invention also relates to an apparatus comprising at least one slide valve, according to the invention, the said apparatus being characterized by means for activating the slide a controllable period before the time at which it be desired to open the passage for the flowing medium. In this case it is possible to make the slide open the passage for the flowing medium at exactly the time desired.

If the apparatus comprises two or more slide valves, all the inlets may, according to the invention, be parallel-connected and all the outlets be parallel-connected. This embodiment may be used for increasing the area of the opening for the flowing medium, viz, if all slide valves are actuated simultaneously, or it may be used for increasing the opening frequency, viz, if the valves are actuated cyclically, in which latter case the apparatus according to the invention may comprise a control unit arranged for activating the slides in a cyclic sequence.

The apparatus may, according to the invention, comprise a member connected to at least one of the outlets for producing a feedback signal dependent on the presence of flowing medium in the particular outlet and means for utilizing the feedback signal for adjusting the times for activation of the slide. In this case it is possible to make the actuation period, i.e. the period from the time when working medium is supplied, to the time when passage for the flowing medium is opened, independent of outer factors, such as temperatures or the pressure of the working medium.

The said means for utilizing the feedback signal may according to the invention expediently comprise a variable delay member, e.g. an electric delay line or a shift register.

The invention will be further explained in the following with reference to the drawing in which FIG. 1 shows a first embodiment of a slide valve according to the invention, partly in longitudinal section, FIG. 2 a second embodiment of a slide valve according to the invention, FIG. 3 a block diagram of an embodiment of an apparatus according to the invention, and FIG. 4 a section through a cylinder for e.g. an internal combustion engine surrounded by a number of slide valves according to the invention.

FIG. 1 shows a slide valve cylinder 1 in which a slide 2 can be displaced axially. At the middle of the cylinder 1 an inlet pipe 3 and an outlet pipe 4, for a flowing medium, e.g. compressed air or pressurized oil, have been connected. In the position of the slide 2 shown in FIG. 1, which position is not a stable position, the passage is open from the inlet pipe 3, round the narrow portion 5 of the slide to the outlet pipe 4. At either end of the cylinder 1 a magnet valve 6 and 7 has diagrammatically been indicated. Each of the valves 6 and 7 is provided with an inlet pipe, 8 and 9, respectively, for a working medium which may likewise be e.g. compressed air or pressurized oil. The magnet valves are controlled via leads 10 and 11.

When one of the magnet valves 6 and 7 is actuated, via the associated lead 10 or 11, the working medium is admitted from the associated pipe 8 or 9 to the particular end of the cylinder 1. If for example it be supposed that the slide 2 is in the left end position in FIG. 1 and the magnet valve 6 is actuated via the lead 10, the working medium will flow into the left end of the cylinder 1, and the slide 2 will be transferred into the right end position in the cylinder. When the slide passes the intermediate position shown in FIG. 1 the passage for the flowing medium from the inlet pipe 3 to the outlet pipe 4 will be opened for a short period.

The magnet valves 6 and 7 are preferably designed as three-way valves, so that the ends of the cylinder 1 are in communication with the atmosphere when the magnet valves are not actuated. For regulating the speed of the slide the said communications to the atmosphere may be throttled more or less. Furthermore, the cylinder and slide may be so designed that, when the slide moves towards one or the other end of the cylinder, a blocked-off volume of air will be produced which acts as brake and buffer for the slide.

The opening period for the passage from the inlet pipe to the outlet pipe depends on several different factors, amongst other things e.g. on the speed of the slide, the said speed being in turn dependent on the pressure of the working medium, and on the throttling. The said opening period is also dependent on the constructive details, for example, on the length of the narrow portion 5, on the width of the inlet pipe 3, and on outlet pipe 4. The reaction period, viz. the period between the time when one of the magnet valves are opened, and the time when the passage for the flowing medium is opened, is generally speaking dependent on the same factors, as well as on the length of the acceleration path. For the period between two successive openings of the passage the time of deceleration is furthermore of importance.

In the embodiment shown in FIG. 1 the cylinder is supposed to have a circular cross section. The cylinder may, however, have any other cross section and may for example be of rectangular or square section.

The embodiment shown in FIG. 2 differs from that shown in FIG. 1 in that the slide 2 has three narrow portions, 12, 13, and 14, and that the inlet pipe is correspondingly designed as an inlet manifold 15 and the outlet pipe as an outlet manifold 16. In the central position of the slide 2 shown in FIG. 2, which position is not a stable position, all of the three branches on the inlet manifold 15 are, via the narrow portions 12, 13 and 14, in communication with the three branches on the outlet manifold 16. In the two end positions, however, all of the three branches of the inlet manifold 15 are blocked, and all of the three branches of the outlet manifold 16 are likewise blocked.

With the embodiment shown in FIG. 2 a very large passage area may be obtained, and this is of particular importance if the opening periods are short.

In the diagram shown in FIG. 3 three slide valves 17, 18 and 19 are indicated which are all parallel-connected to a common inlet pipe 20 and are likewise all parallel-connected to a common outlet pipe 21.

The three slide valves are controlled from a common control unit 22 which transmits opening pulses to the magnet valves of the slide valves and which itself receives control pulses from a pulse generator 23. If the slide valves are used in connection with a rotary engine, e.g. an internal combustion engine or a compressor, the pulse generator may e.g. be constituted by a cam contact which transmits a pulse every time the said rotary part has turned one revolution.

The apparatus shown in FIG. 3 may be controlled in different ways. The three slide valves 17, 18 and 19 may either be controlled simultaneously, in which case a large passage area is obtained as is the case with the embodiment shown in FIG. 2, or the three slide valves may be controlled successively, by which means it is inter alia possible to obtain openings, following upon each other in quick succession, of the passage for the flowing medium. In the case that the control pulses for the control unit have constant time intervals the apparatus shown in FIG. 3 may moreover be used for reducing the reaction time to a value which is smaller than the value obtainable by means of a single slide valve. For this purpose the control pulses are delayed so much that the opening, controlled by a given pulse, of the passage for the flowing medium does not occur until after the occurrence of the next control pulse. Hereby the reaction period becomes in fact equal to the period between a given control pulse and the opening of the passage for the flowing medium caused by the preceding control pulse. This period can be made arbitrarily small and can even be reduced to zero. By a suitable choice of the delay, and of the number of slide valves, the period between a given opening of the passage for the flowing medium and the next following opening may be made optionally small. Finally, by a suitable control of the magnitude of the delay, e.g. in dependence on the acceleration of an internal combustion motor, a desired variation of the reaction period in dependence on the prevailing operational conditions may be obtained.

To attain the said delay, the apparatus shown in FIG. 3 comprises a delay member 24 which may e.g. be constituted by an electric delay line or by a shift register controlled by a pulse generator.

With a view to avoiding other factors influence the reaction time, the apparatus shown in FIG. 3 includes a converter 25 which, based on the pressure in the outlet pipe, produces an electric signal which is used as a feedback signal, via the control unit 22, to vary the delay of the delay member 24.

As indicated above, the slide valve according to the invention may be used in connection with e.g. an internal combustion engine or a compressor, in which case there are expediently used a comparatively large number of slide valves in connection with each of the cylinders of the particular engine. In FIG. 4 an example of such an arrangement has been illustrated. Here is shown a cylinder 26 in an internal combustion engine or a compressor, the said cylinder being surrounded by a number of slide valves, the valve cylinders of which are designated by 27. All the valve cylinders are preferably parallel-connected in conformity with the arrangement shown in FIG. 3, and they are furthermore expediently distributed in a number of groups which are actuated cyclically, likewise in conformity with the arrangement shown in FIG. 3, while the slide valves within a group are actuated simultaneously.

The slide valves need not, as is the case in the examples so far described, be actuated by equidistant pulses. If for example the flowing medium is to be used for acting on objects advanced in a completely random order, the control pulses will occur distributed in an irregular manner.

In the examples described above it has been assumed that the movement of the slide is brought about by means of a pressure medium supplied to the ends of the cylinder. However, the movement of the slide may also be obtained in other ways. For example, the slide may be constituted by a magnetic armature movable in a solenoid arranged around the cylinder.

What I claim is:

1. A slide valve for opening and closing at least one passage for a flowing medium, comprising: a cylinder with inlet and outlet means for the medium, a slide axially displaceable in the cylinder, means for displacing the slide in the cylinder, the slide being so designed and the inlets and outlets so disposed on the cylinder that the passage for the flowing medium is open in an intermediate position of the slide and closed in the end positions of the slide, control means for causing the means for displacing the slide to drive same from one end position to the other end position in a rapid and uninterrupted movement so that the passage is opened for a brief increment of each travel of the slide.

2. A slide valve as claimed in claim 1, comprising several inlets and several outlets, thereby defining several passages for the flowing medium, the slide being so designed and the inlet and outlets so disposed on the cylinder that all passages for the flowing medium are opened and closed simultaneously.

3. A slide valve for opening and closing at least one passage for a flowing medium, comprising: a cylinder with inlet and outlet means for the medium, a slide axially displaceable in the cylinder, means for displacing the slide in the cylinder, the slide being so designed and the inlets and outlets so disposed on the cylinder that the passage for the flowing medium is open in an intermediate position of the slide and closed in the end positions of the slide, and means for activating the slide a controllable period before the time at which it be desired to open the passage for the flowing medium.

4. An apparatus as claimed in claim 3, comprising more than one slide valve, wherein the inlets of each valve are parallel-connected and the outlets of each valve are parallel-connected.

5. An apparatus as claimed in claim 4, wherein the improvement comprises a control unit arranged for activating the slides in a cyclic sequence.

6. An apparatus as claimed in claim 4 wherein the improvement comprises a member connected to at least one of the outlets for generating a feedback signal dependent on the presence of flowing medium in the particular outlet, and means for utilizing the feedback signal for adjusting the times for activation of the slide.

7. An apparatus as claimed in claim 6, wherein the improvement comprises that the said means for utilizing the feedback signal comprise a variable delay member.

References Cited

UNITED STATES PATENTS

| | | | |
|---|---|---|---|
| 1,193,577 | 8/1916 | McGowan | 137—625.38 |
| 2,671,632 | 3/1954 | Palmer | 137—625.37 |

FOREIGN PATENTS 1,237,237   6/1960   France.

ROBERT G. NILSON, Primary Examiner

U.S. Cl. X.R.

137—624.15, 625.37; 251—324